(12) United States Patent
Heafitz et al.

(10) Patent No.: US 11,305,871 B2
(45) Date of Patent: Apr. 19, 2022

(54) PASSIVE ROTOR ALIGNMENT IN A FREE-WHEELING STATE

(71) Applicant: Aurora Flight Sciences Corporation, Manassas, VA (US)

(72) Inventors: Andrew Mark Heafitz, Cambridge, MA (US); Robert William Parks, San Jose, CA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 248 days.

(21) Appl. No.: 16/515,340

(22) Filed: Jul. 18, 2019

(65) Prior Publication Data

US 2021/0016876 A1    Jan. 21, 2021

(51) Int. Cl.
*B64C 27/30* (2006.01)
*B64C 27/22* (2006.01)
(Continued)

(52) U.S. Cl.
CPC .............. *B64C 27/30* (2013.01); *B64C 27/22* (2013.01); *B64C 27/463* (2013.01); *B64C 29/0025* (2013.01)

(58) Field of Classification Search
CPC ..... B64C 27/46; B64C 27/463; B64C 27/467; B64C 27/30; B64C 27/615; B64C 2027/7205; B64C 2027/7261; B64C 2027/7266; B64C 23/00; B64C 23/06; B64C 23/065; B64C 23/069; B64C 23/072; B64C 23/076; B64C 27/72; B64C 2003/148; B64C 3/58; B64C 5/00; B64C 5/06; B64C 5/10; B64C 5/12; B64C 5/16;
(Continued)

(56) References Cited

U.S. PATENT DOCUMENTS 9,334,049 B1   5/2016 Legrand et al.
9,409,642 B1 * 8/2016 Pingree ............... B64C 29/0025
(Continued)

FOREIGN PATENT DOCUMENTS

EP    3464061 A1   4/2019
WO   2017208037 A1  12/2017

OTHER PUBLICATIONS

European Search Report; Application EP20183121; dated Dec. 9, 2020.

*Primary Examiner* — Joshua J Michener
*Assistant Examiner* — Cindi M Curry
(74) *Attorney, Agent, or Firm* — Duft & Bornsen, PC

(57) ABSTRACT

Rotor assemblies for aircraft are described where one or more blades of the rotor assembly includes a blade alignment device that passively orients a blade in response to an airflow around the blade alignment device when the rotor assembly is free-wheeling. One embodiment comprises a method of operating a rotor assembly for aircraft. The method comprises operating the rotor assembly in a free-wheeling state, where the rotor assembly includes a rotary hub that rotates about an axis and a plurality of blades extending radially from the rotary hub. At least one of the plurality of blades includes a blade alignment device. The method further comprises aligning the at least one of the plurality of blades in response to airflow around the blade alignment device when the rotor assembly is in the free-wheeling state.

21 Claims, 20 Drawing Sheets

(51) Int. Cl.
*B64C 27/46* (2006.01)
*B64C 29/00* (2006.01)

(58) Field of Classification Search
CPC .... B64C 7/00; B64C 9/00; B64C 9/02; B64C 9/08; B64C 9/32; B64C 9/323; B64C 9/34; B64C 11/16; B64C 11/18; B64C 11/20; B64C 11/28; B64C 21/00; B64C 29/00; B64C 29/0091; B64C 29/02; B64C 2230/02
See application file for complete search history.

(56) References Cited

U.S. PATENT DOCUMENTS

| | | | |
|---|---|---|---|
| 10,137,982 B1 | 11/2018 | Dormiani et al. | |
| 2003/0173459 A1* | 9/2003 | Fanucci | B64C 5/12 244/123.2 |
| 2012/0086209 A1* | 4/2012 | Obrecht | F03D 17/00 290/55 |

* cited by examiner

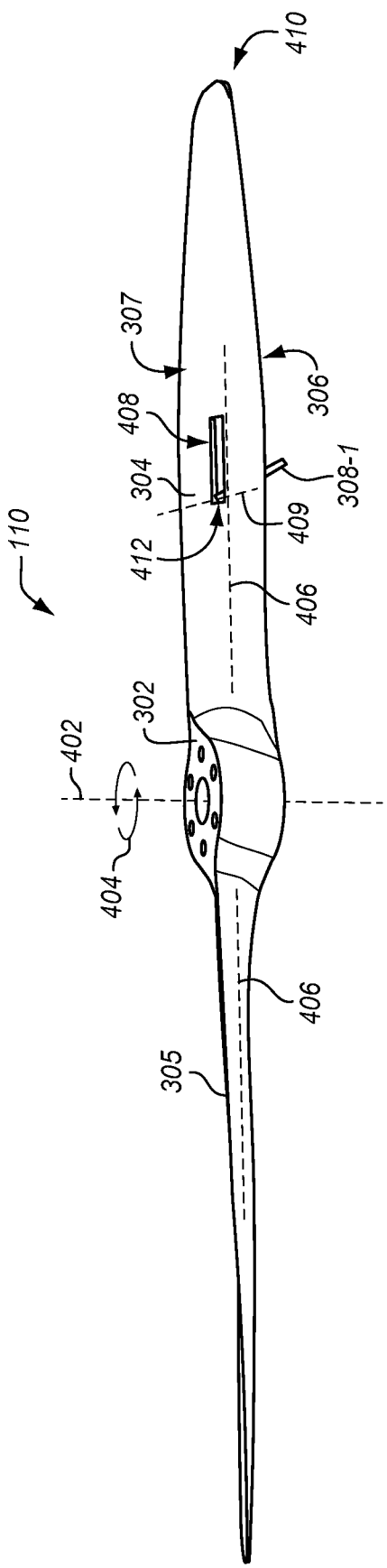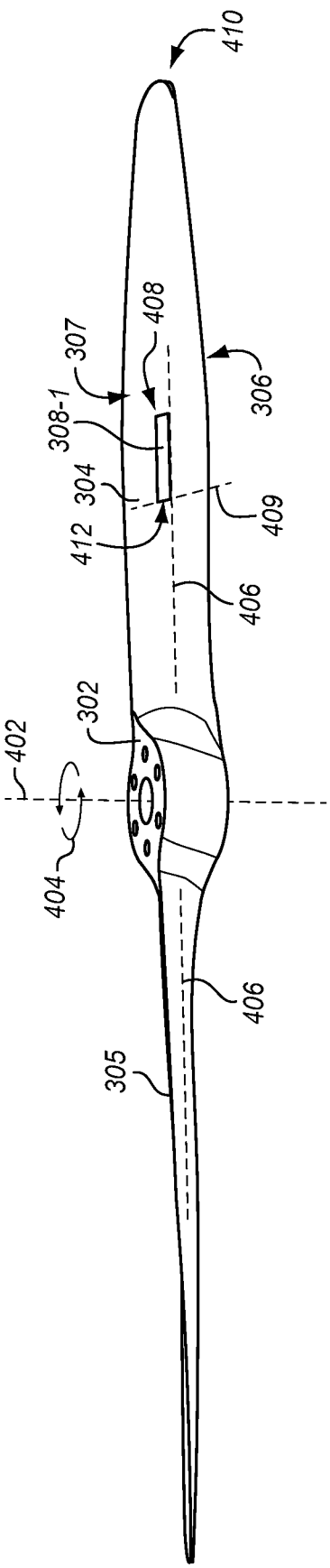

PASSIVE ROTOR ALIGNMENT IN A FREE-WHEELING STATE

FIELD

This disclosure relates to the field of aircraft and, in particular, to aircraft that utilize rotors.

BACKGROUND

A type of aircraft that can take off, hover, and land vertically is referred to as a Vertical Take-Off and Landing (VTOL) aircraft. A VTOL aircraft has one or more rotors that produce vertical lift. Some VTOL aircraft also have fixed-wings that generate lift when the aircraft is propelled forward by a propeller, a jet engine, etc. When these fixed-wing aircraft convert from vertical flight to horizontal or wing-borne flight, the rotors are not driven in rotation. One problem is that the rotors can produce drag when they free-wheel, which hinders the efficiency of wing-borne flight.

SUMMARY

Rotor assemblies for aircraft are described where one or more blades of the rotor assembly includes a blade alignment device that passively orients a blade in response to an airflow around the blade alignment device when the rotor assembly is free-wheeling.

One embodiment comprises a method of operating a rotor assembly for aircraft. The method comprises operating the rotor assembly in a free-wheeling state, where the rotor assembly includes a rotary hub that rotates about an axis and a plurality of blades extending radially from the rotary hub. At least one of the plurality of blades includes a blade alignment device. The method further comprises aligning the at least one of the plurality of blades in response to airflow around the blade alignment device when the rotor assembly is in the free-wheeling state.

Another embodiment comprises a rotor assembly for aircraft. The rotor assembly includes a rotary hub that rotates about an axis, and a plurality of blades extending radially from the rotary hub. At least one of the plurality of blades includes a blade alignment device that aligns the at least one of the plurality of blades in response to an airflow around the blade alignment device when the rotor assembly is free-wheeling.

Another embodiment comprises an aircraft that includes at least one rotor assembly that provides lift for the aircraft. The at least one rotor assembly includes a rotary hub that rotates about an axis, and a plurality of blades extending radially from the rotary hub. At least one of the plurality of blades includes a blade alignment device that aligns the at least one of the plurality of blades in response to an airflow around the blade alignment device when the rotor assembly is free-wheeling.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIG. 5A is a perspective view of a rotor assembly with a blade alignment device proximate to a midpoint in the blade and in a deployed position in an illustrative embodiment.

FIG. 5B is a perspective view of the rotor assembly of FIG. 5A with the blade alignment device proximate to a midpoint in the blade and in a stowed position in an illustrative embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
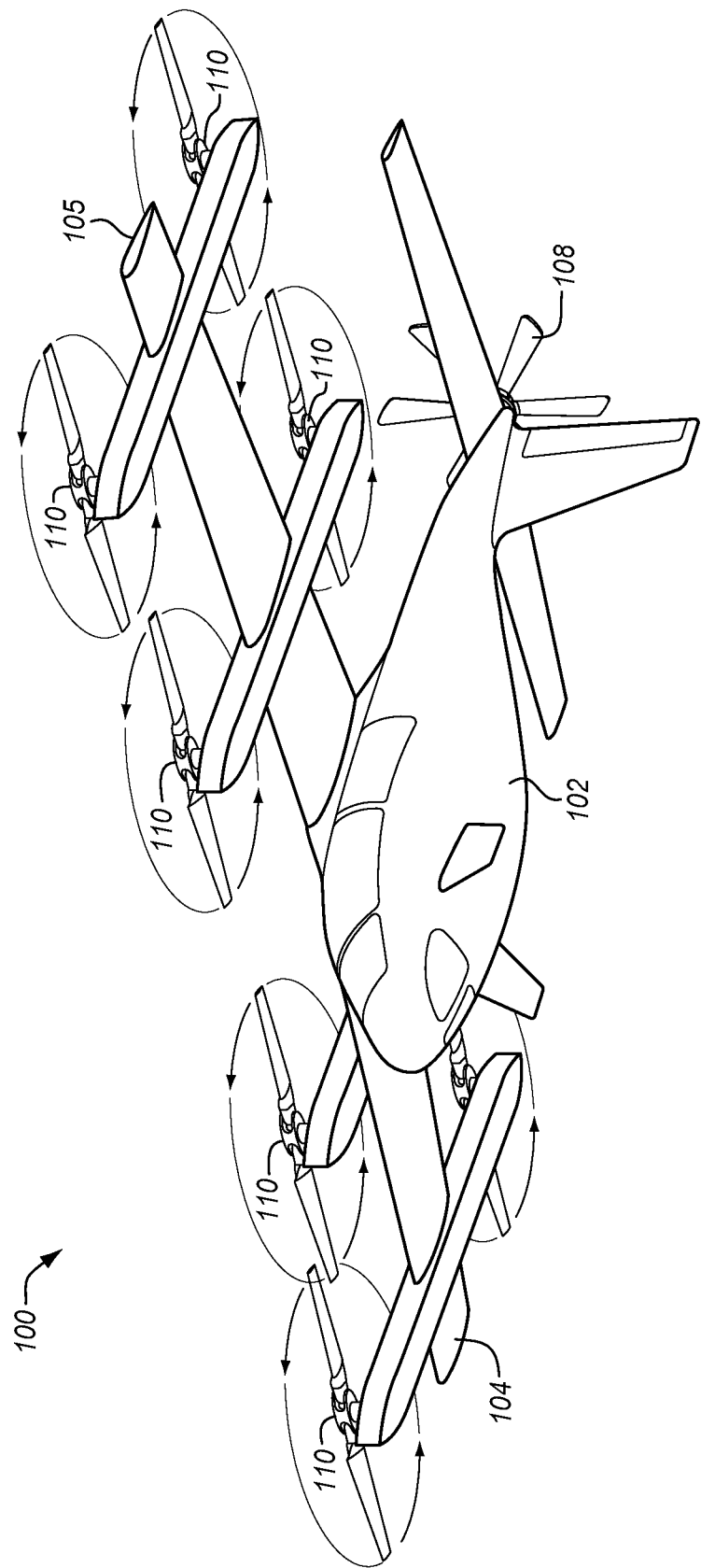
FIG. 1 is a perspective view of an aircraft in an illustrative embodiment.

FIG. 1 is a perspective view of an aircraft 100 in an illustrative embodiment. Aircraft 100 may be a manned aircraft that is flown by one or more pilots, or may be an unmanned aircraft (e.g., a drone). The structure of aircraft 100 is merely provided as an example, and the concepts described herein apply to any aircraft. In this example, aircraft 100 includes a fuselage 102, and wings 104-105 extending from opposite sides of fuselage 102 to define a support plane for horizontal or wing-borne flight. Aircraft 100 also includes a propeller 108 that provides thrust for wing-borne flight, although other types of engines are used to generate thrust in other embodiments.

To provide vertical flight (i.e., take-off, hover, and landing), aircraft 100 includes one or more rotor assemblies 110. The number and locations of the rotor assemblies 110 shown in FIG. 1 are merely for example, and vary as desired. Further, although rotor assemblies 110 are illustrated as including two blades each, rotor assemblies 110 include a different number of blades in other embodiments.

Figure 2:
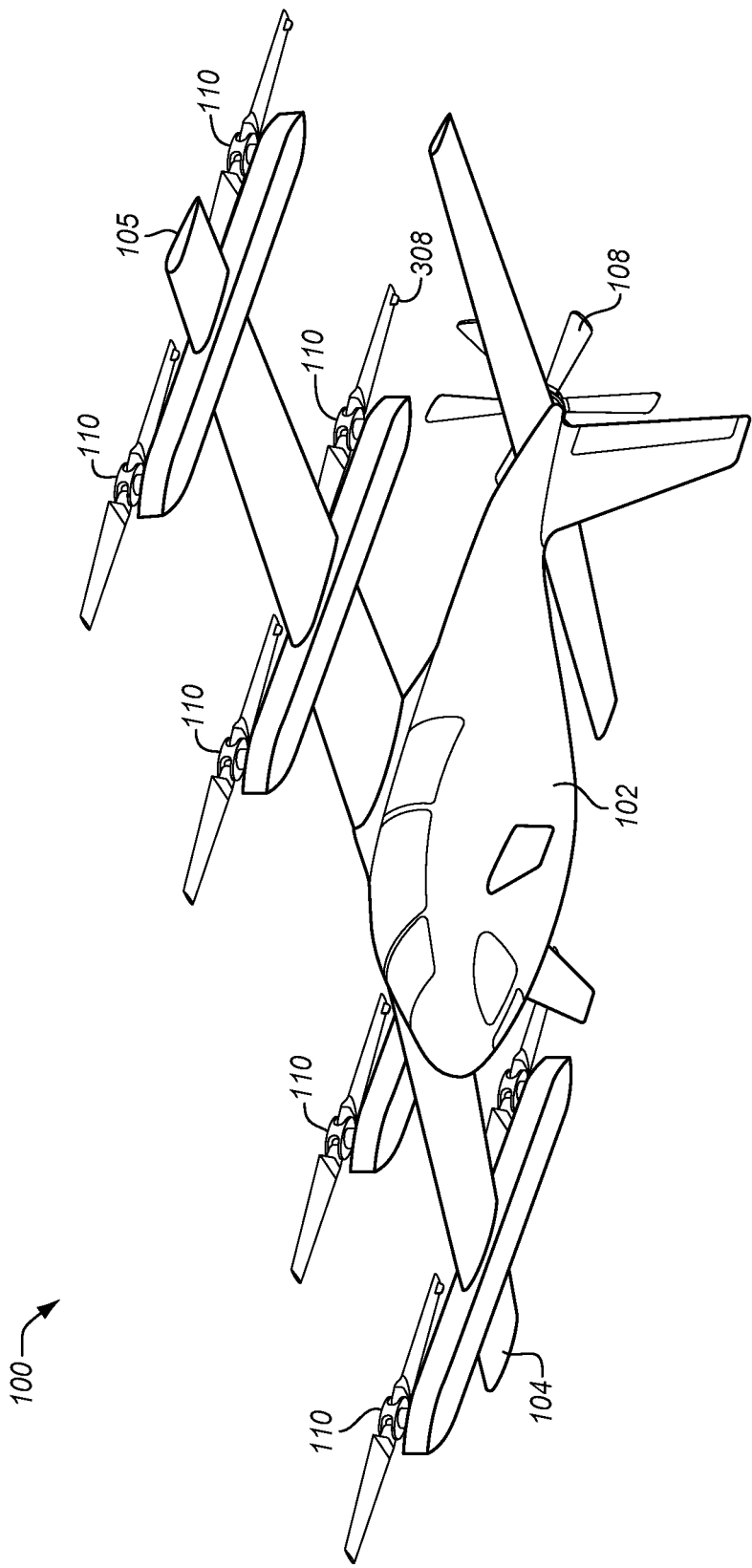
FIG. 2 is a perspective view of the aircraft of FIG. 1 during a cruise phase in an illustrative embodiment.

As rotor assemblies 110 spin via a motor that can be operated mechanically, electrically, or using a combination of mechanically and electrically, rotor assemblies 110 provide vertical lift so that aircraft 100 is able to take-off, hover, and land. FIG. 2 is a perspective view of aircraft 100 during a cruise phase in an illustrative embodiment. In FIG. 2, when aircraft 100 transitions from vertical flight to wing-borne flight, the blades of rotor assemblies 110 passively orient themselves to reduce drag. In the embodiments described herein, rotor assemblies 110 are enhanced in that one or more blades include a blade alignment device 308 that passively orients the rotor assemblies 110 in response to an airflow around blade alignment device 308 when rotor assemblies 110 are free-wheeling (e.g., when rotor assemblies 110 are not driven in rotation). Since rotor assemblies 110 are oriented passively, the efficiency during the cruise phase illustrated in FIG. 2 is improved. Additionally, by passively aligning the propellers of rotor assemblies 110 with the local direction of the airflow, rotor assemblies 110 are positioned in the lowest possible drag position. If the propellers were mechanically locked into a fore-aft position, variations in the airflow around each propeller could cause them to not always be positioned precisely into the airflow. By allowing them to freely and passively find the direction of the airflow, drag is minimized. Although blade alignment device 308 illustrated in FIG. 2 is depicted to have a particular shape, other embodiments exist for blade alignment device 308.

Figure 3:
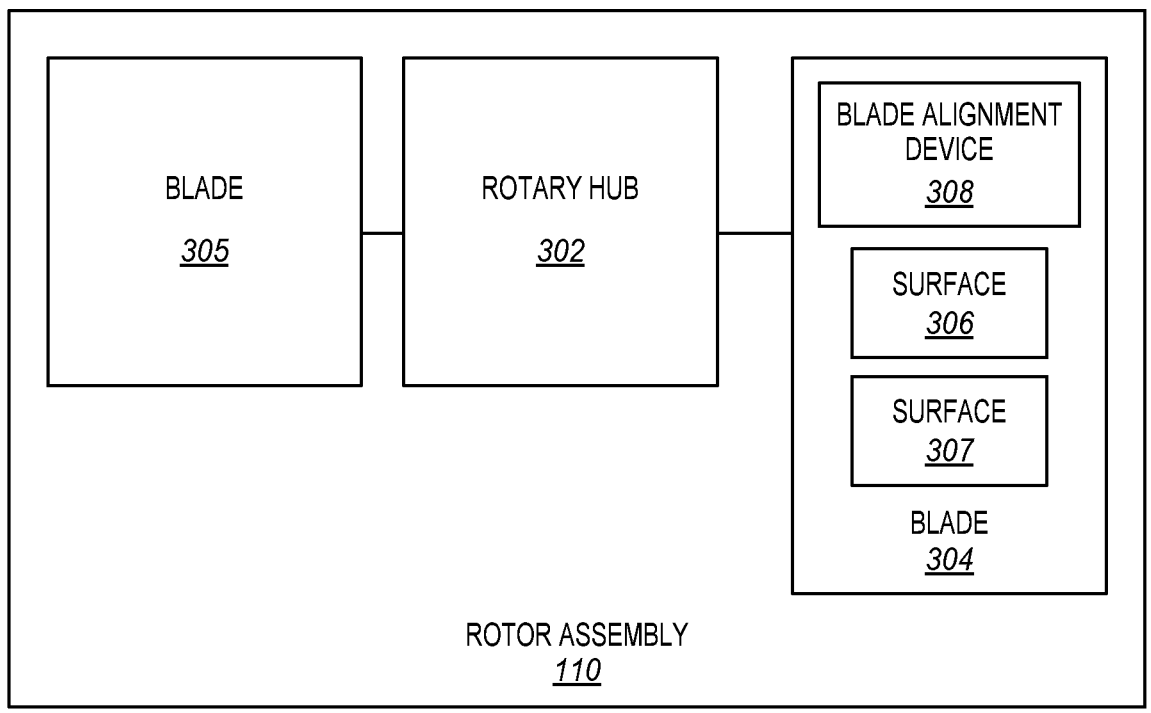
FIG. 3 is a block diagram of a rotor assembly in an illustrative embodiment.

FIG. 3 is a block diagram of rotor assembly 110 in an illustrative embodiment. In this embodiment, rotor assembly 110 includes a rotary hub 302 that rotates about an axis (not shown). Rotor assembly 110 further includes a plurality of blades 304-305 that extend radially from rotary hub 302. Although only two of blades 304-305 are illustrated in FIG. 3, rotor assembly 110 includes any number of blades as a matter of design choice.

In this embodiment, blade 304 includes surfaces 306-307, which form an airfoil for blade 304. Blade 304 includes a blade alignment device 308 that conforms to surface 306 and/or surface 307 of blade 304 in a stowed position, and projects away from surface 306 and/or surface 307 of blade 304 in a deployed position. Generally, blade alignment device 308 in the deployed position aligns blade 304 in response to an airflow around blade alignment device 308 when rotor assembly 110 is free-wheeling (e.g., when rotary hub 302 is not driven in rotation). Blade alignment device 308 is in the stowed position when rotor assembly 110 is in operation (e.g., when rotary hub 302 is driven in rotation) to ensure that blade alignment device 308 does not interfere with the chordwise airflow across surface 306 and/or surface 307 of blade 304, which would reduce the lift of blade 304. Although blade alignment device 308 is illustrated on blade 304 in this embodiment, blade alignment device 308 in other embodiments is implemented on any number of blades as a matter of design choice.

Figure 4A:
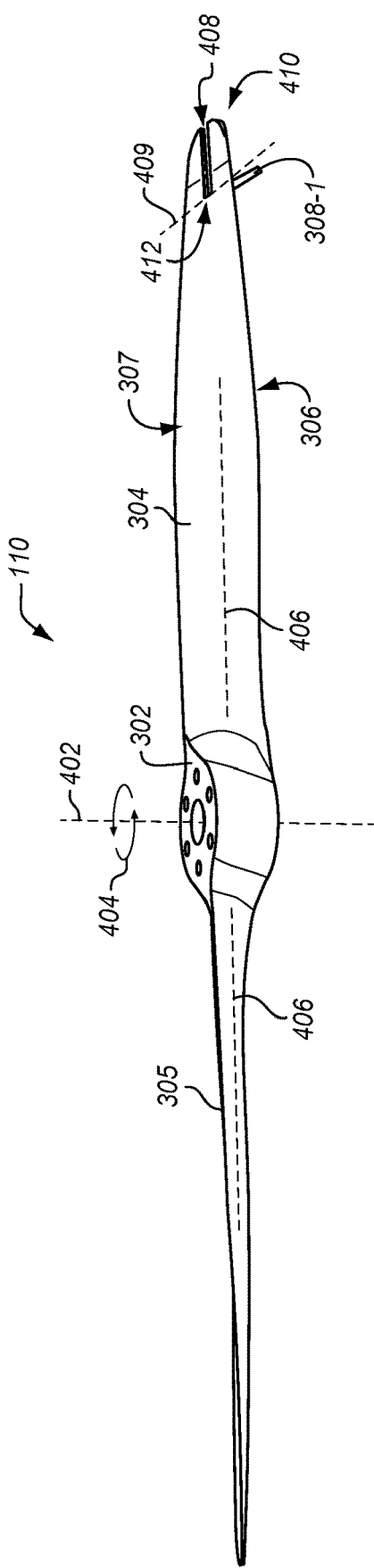
FIG. 4A is a perspective view of a rotor assembly with a blade alignment device proximate to a blade tip and in a deployed position in an illustrative embodiment.

FIG. 4A is a perspective view of a rotor assembly with a blade alignment device 308 proximate to a tip 410 of blade 304 and in a deployed position in an illustrative embodiment. In this embodiment, rotor assembly 110 includes rotary hub 302, which is mechanically driven to rotate about an axis 402 in the direction of arrow 404 to provide lift to aircraft 100. Blades 304-305 extend radially from rotary hub 302 in this embodiment. In particular, blades 304-305 extend radially from rotary hub 302 along a longitudinal direction 406 that is substantially perpendicular to axis 402. Rotor assembly 110 in this embodiment further includes a spanwise fin 308-1, which operates similar to blade alignment device 308 previously described to passively orient rotor assembly 110 as illustrated in FIG. 2.

In this embodiment, spanwise fin 308-1 (i.e., one embodiment of blade alignment device 308) is proximate to a tip 410 of blade 304 and projects away from surface 306 of blade 304 in the deployed position when rotor assembly 110 is free-wheeling. Spanwise fin 308-1 conforms to surface 306 of blade 304 in the stowed position when rotor assembly 110 is driven in rotation. Generally, spanwise fin 308-1 is placed along the span of the airfoil of blade 304. Although spanwise fin 308-1 is illustrated as projecting away from surface 306, spanwise fin 308-1 in other embodiments is implemented, instead of or in addition to, to project away from surface 307.

Figure 4B:
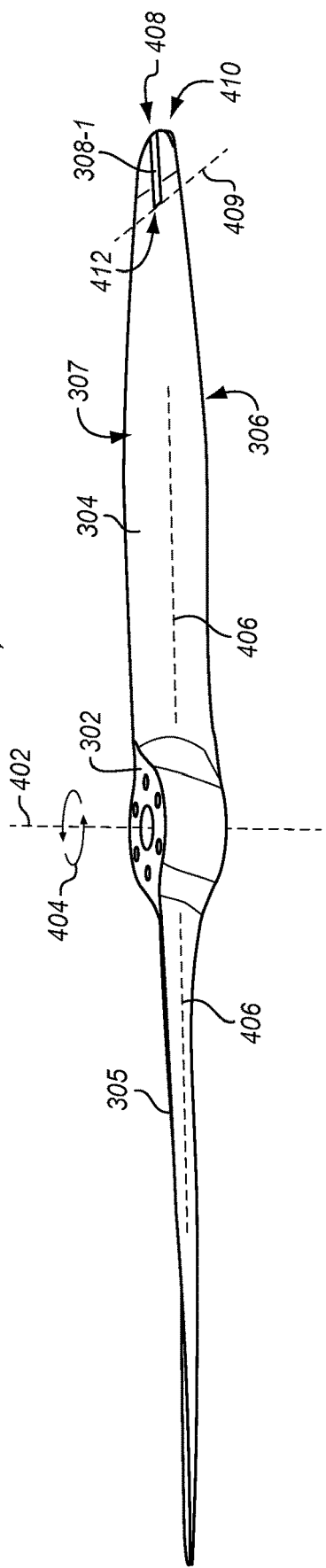
FIG. 4B is a perspective view of the rotor assembly of FIG. 4A with the blade alignment device proximate to the blade tip and in a stowed position in an illustrative embodiment.

FIG. 4B is a perspective view of rotor assembly 110 with blade alignment device 308 proximate to tip 410 of blade 304 and in a stowed position in an illustrative embodiment. In FIG. 4B, spanwise fin 308-1 is in the stowed position when rotary hub 302 is mechanically driven to provide lift to aircraft 100. In the stowed position, spanwise fin 308-1 is retained within a cutout 408 within blade 304, which allows spanwise fin 308-1 to conform to surface 306 and surface 307 of blade 304 when rotary hub 302 is mechanically driven in rotation. Although cutout 408 is illustrated near tip 410 of blade 304, cutout 408 in other embodiments is located at other positions between tip 410 and rotary hub 302 on blade 304 as a matter of design choice.

In some embodiments, spanwise fin 308-1 projects away from surface 306 of blade 304 (see FIG. 4A) utilizing a spring (not shown) or other mechanical actuator (not shown) when rotor assembly 110 is idle. For instance, spanwise fin 308-1 is rotationally coupled to short edge 412 of cutout 408, and pivots about a pivot axis 409 out of cutout 408 in response to a trigger. The trigger, in some embodiments, is the result of the release of a retaining device (not shown) or other mechanical feature which normally retains spanwise fin 308-1 within cutout 408 until activated.

In some embodiments, spanwise fin 308-1 conforms to and projects away from surface 306 of blade 304 in response to changes in a rotational rate of rotary hub 302. For example, spanwise fin 308-1 passively transitions to the stowed position and conforms to surface 306 (e.g., spanwise fin 308-1 pivots at short edge 412 into cutout 408) in response to a rate of rotation being greater than a first rotational rate, and passively transitions to the deployed position and projects from surface 306 (e.g., spanwise fin 308-1 pivots at short edge 412 out of cutout 408) in response to the rate of rotation being less than a second rotational rate. In some embodiments, the first rotational rate is greater than the second rotational rate.

In other embodiments, spanwise fin 308-1 passively transitions to the stowed position and conforms to surface 306 of blade 304, and passively transitions to the deployed position and projects away from surface 306 of blade 304 in response to changes in a centrifugal force applied to spanwise fin 308-1. For example, spanwise fin 308-1 passively transitions to the stowed position and conforms to surface 306 (e.g., spanwise fin 308-1 pivots at short edge 412 into cutout 408) in response to a centrifugal force applied to spanwise fin 308-1 being greater than a first centrifugal force value, and passively transitions to the deployed position and projects from surface 306 (e.g., spanwise fin 308-1 pivots at short edge 412 out of cutout 408) in response to the centrifugal force applied to spanwise fin 308-1 being less than a second centrifugal force value. In these embodiments, the first centrifugal force value is greater than the second centrifugal force value.

FIG. 5A is a perspective view of a rotor assembly with blade alignment device 308-1 proximate to a midpoint in blade 304 and in a deployed position in an illustrative embodiment, and FIG. 5B is a perspective view of the rotor assembly of FIG. 5B with blade alignment device 308-1 proximate to midpoint in blade 304 and in a stowed position in an illustrative embodiment.

As discussed previously, spanwise fin 308-1 may be located at any position between tip 410 of blade 304 and rotary hub 302. In FIGS. 5A-5B, cutout 408 is proximate to a midpoint of blade 304 between tip 410 and rotary hub 302. This is desirable in some embodiments as a thickness of blade 304 typically increases from tip 410 and rotary hub 302.

FIGS. 6-9 are top perspective views of rotor assembly 110 in illustrative embodiments. In particular, FIGS. 6-9 illustrate how spanwise fin 308-1 aligns blade 304 when aircraft 100 is in forward flight and rotor assembly 110 is freewheeling (e.g., rotary hub 302 is free to rotate about axis 402 and is not driven in rotation). Although FIGS. 6-9 will be discussed with respect to spanwise fin 308-1, the principles illustrated in FIGS. 6-10 apply to other embodiments of blade alignment device 308, some of which will be discussed later.

Figure 6:
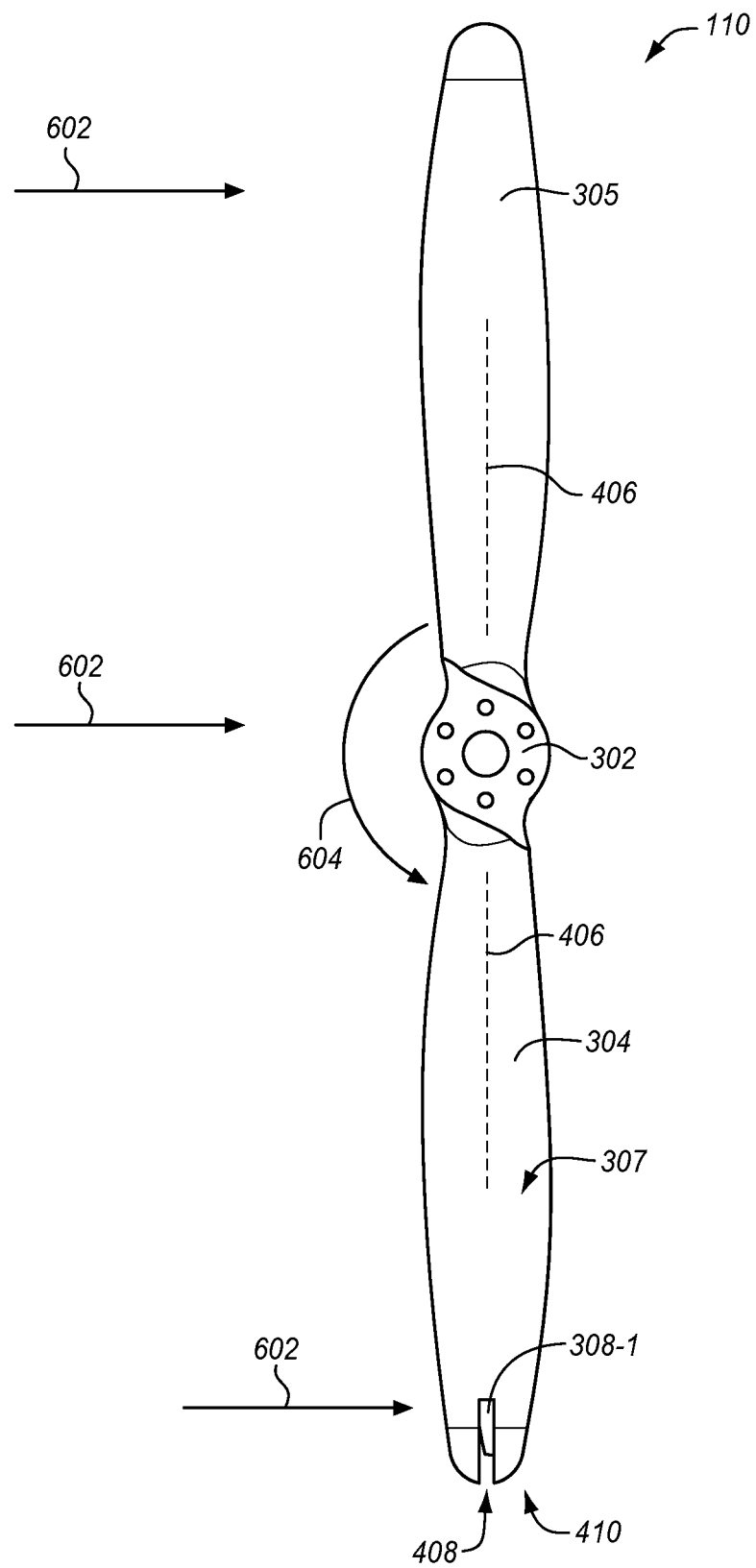
FIGS. 6-9 are top perspective views of the rotor assembly of FIGS. 4A-4B in illustrative embodiments.
Figure 7:
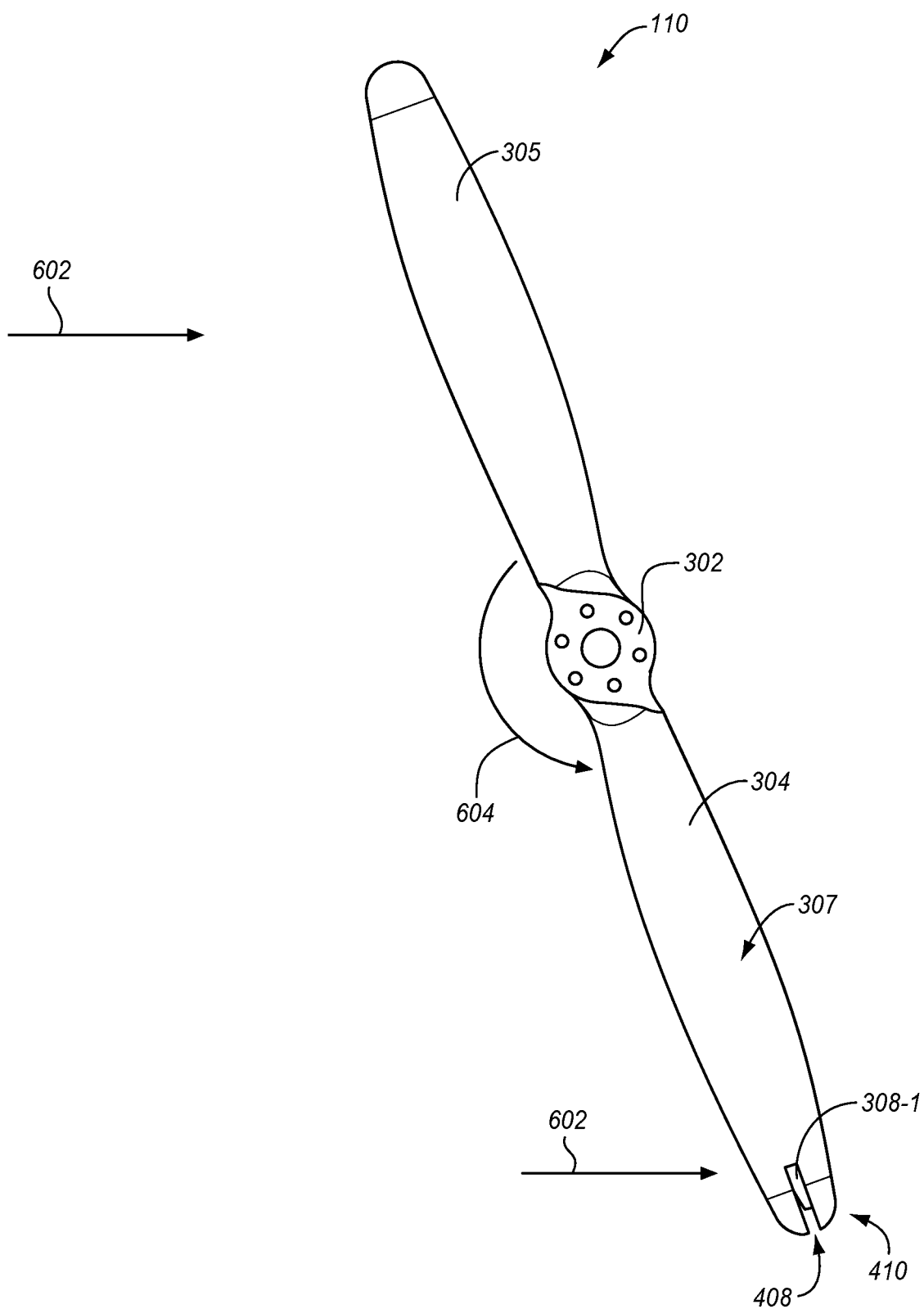
Figure 8:
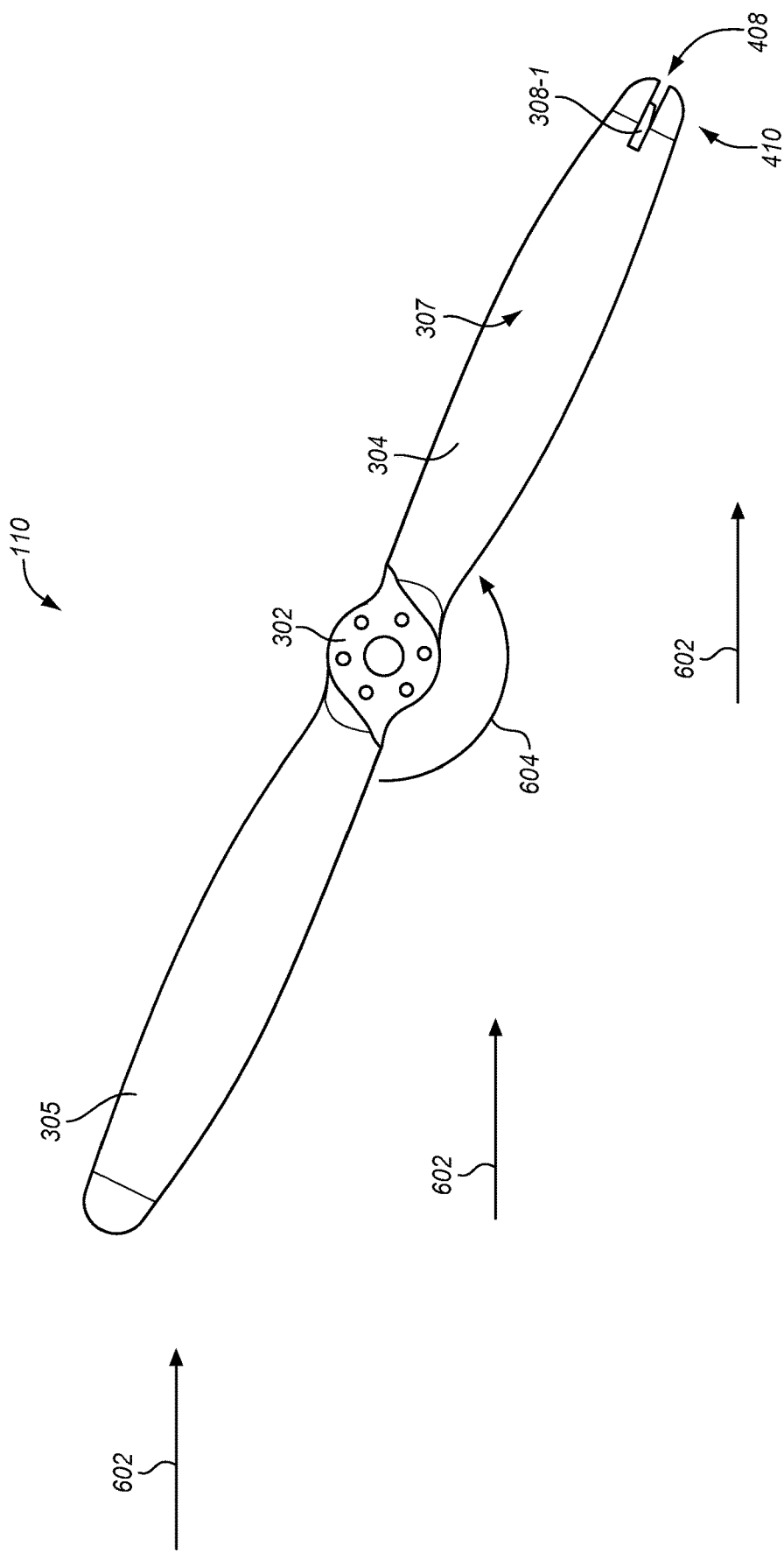
Figure 9:
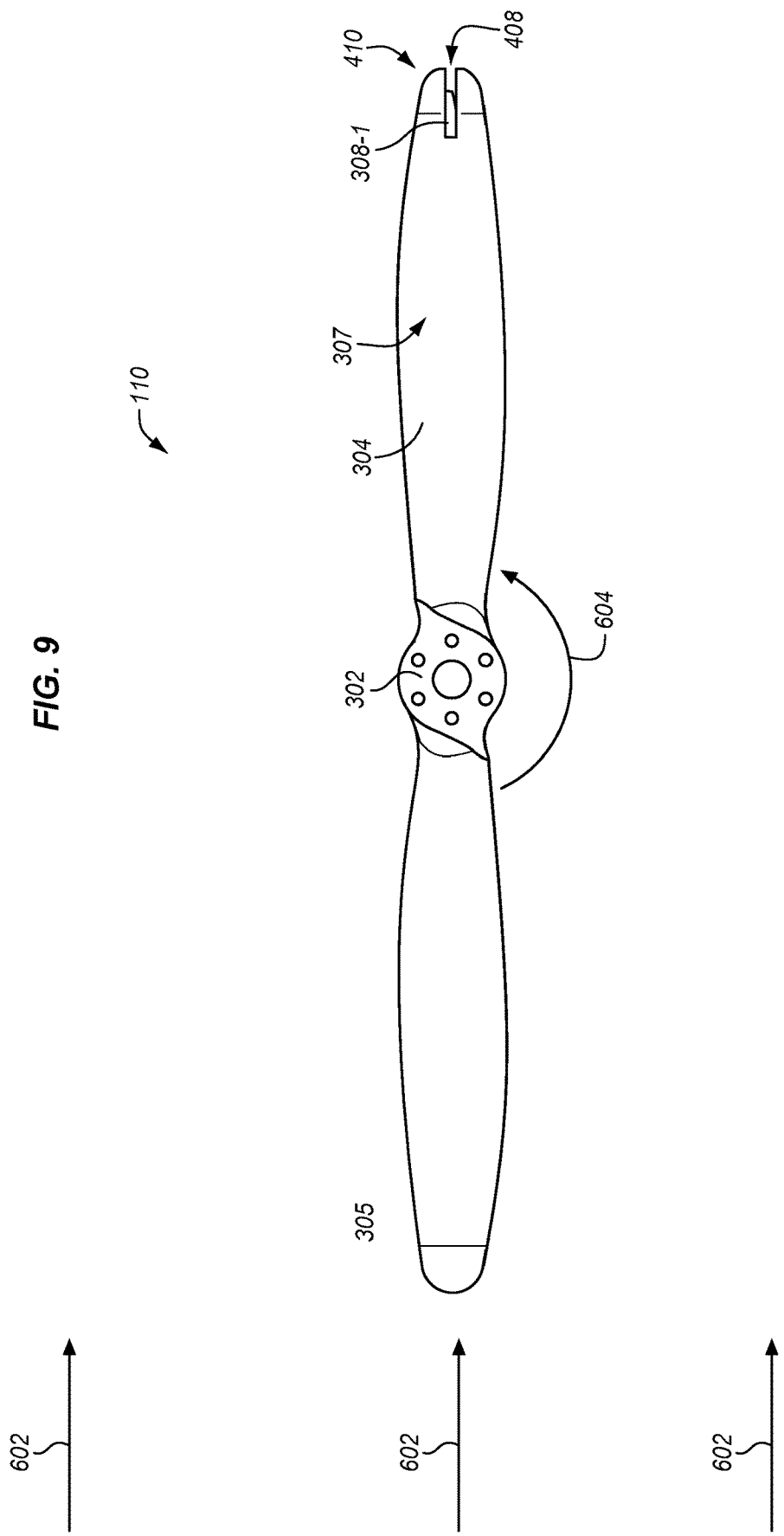

FIG. 6 illustrates the case whereby longitudinal direction 406 of rotor assembly 110 is oriented substantially perpendicular to an airflow 602. This orientation may generate the most drag upon aircraft 100, and may represent the natural orientation of rotor assembly 110 prior to spanwise fin 308-1 aligning blade 304. As airflow 602 flows across spanwise fin 308-1, a torque 604 is generated upon rotary hub 302 which operates to rotate rotary hub 302 in a counter-clockwise direction. The process is illustrated in FIGS. 7-9. As rotor assembly 110 rotates, airflow 602 across spanwise fin 308-1 orients blade 304 in a downstream position with respect to airflow 602, and orients blade 305 in an upstream position with respect to airflow 602. The result of the orientation illustrated in FIG. 9 is that less drag on aircraft 100 is created as compared to the orientation illustrated in FIG. 6.

Because spanwise fin 308-1 operates to passively align blade 304 in response to airflow 602, sensors used to determine an orientation of rotary hub 302 and mechanical power used to hold rotary hub 302 in the orientation illustrated in FIG. 7 are not needed in one technical benefit over the prior art.

Figure 10:
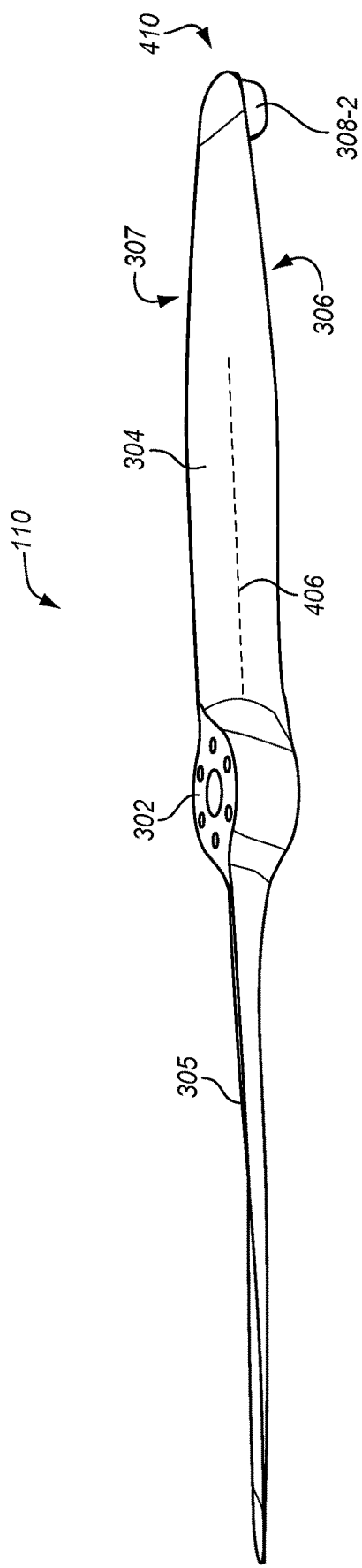
FIGS. 10-12 are perspective views of a rotor assembly that utilizes a spanwise fin as a blade alignment device in an illustrative embodiment.
Figure 11:
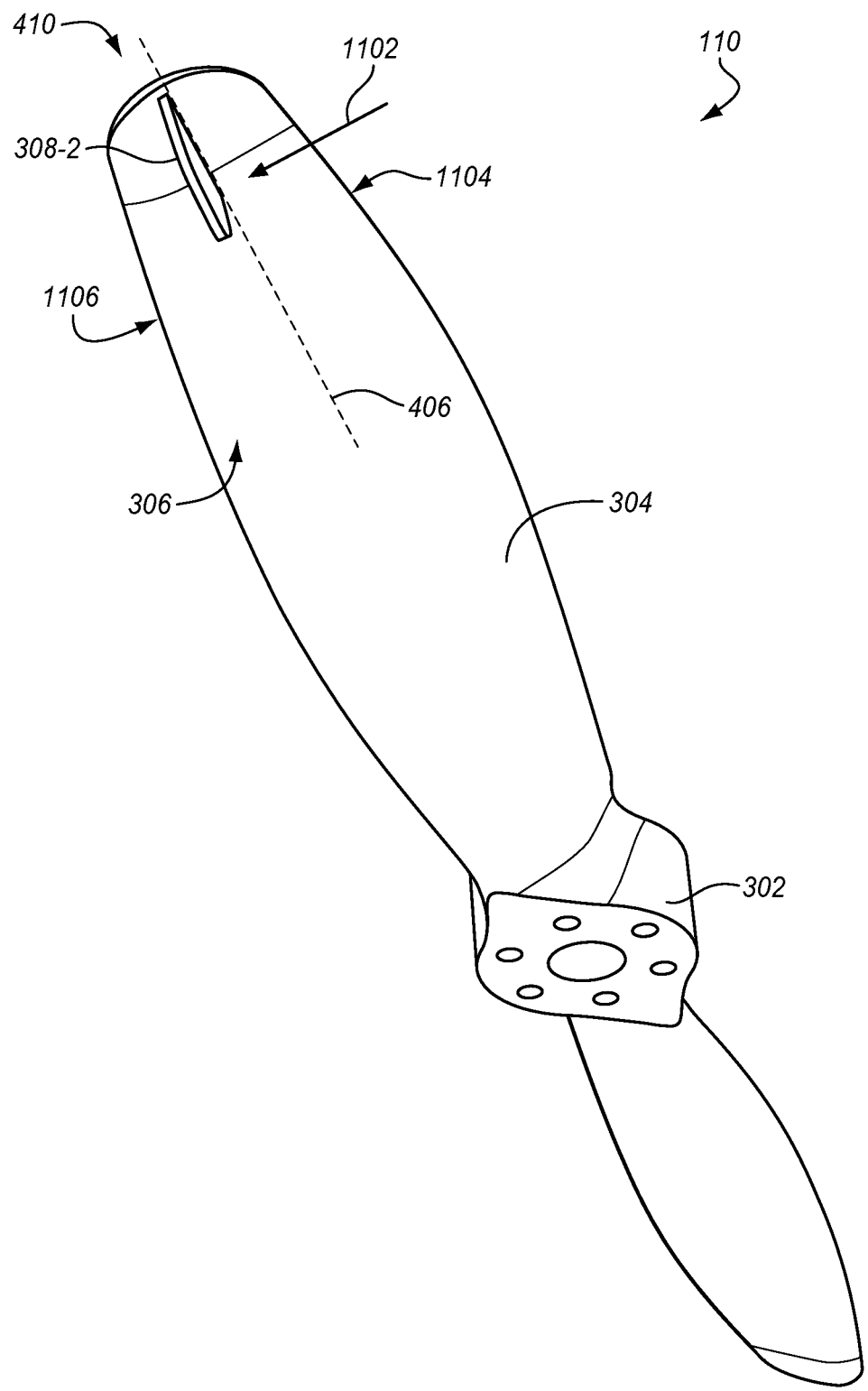
Figure 12:
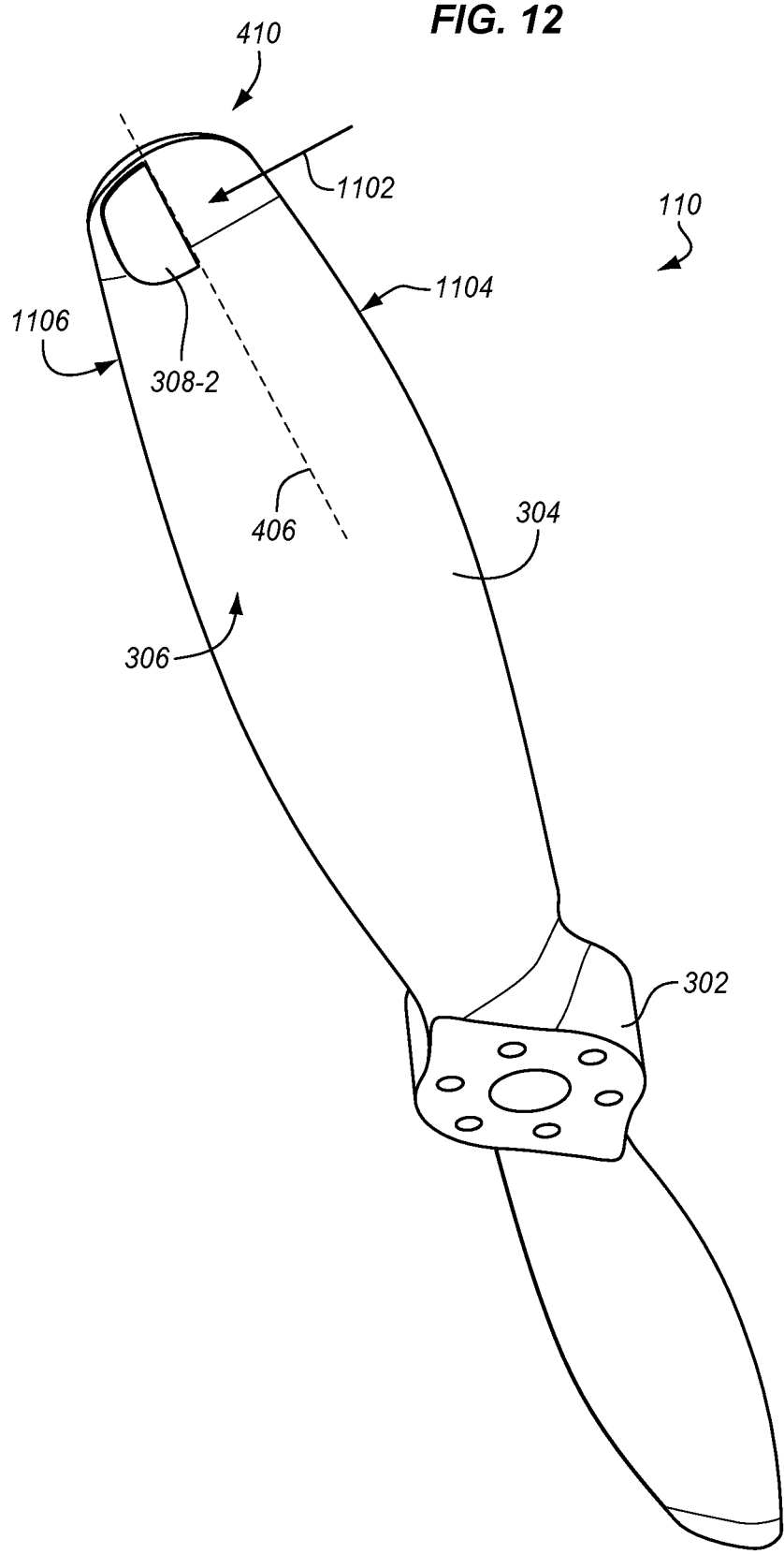

FIG. 10-12 are perspective views of rotor assembly 110 that utilizes a spanwise fin 308-2 as blade alignment device 308 in an illustrative embodiment. In this embodiment, spanwise fin 308-2 is pivotably coupled to surface 306 of blade 304 along longitudinal direction 406. This is further illustrated in FIG. 11, which illustrates a perspective view of rotor assembly 110 of surface 306.

In the embodiments illustrated in FIGS. 10-11, spanwise fin 308-2 projects away from surface 306 of blade 304 in the deployed position when rotor assembly 110 is idle or freewheeling. FIG. 12 illustrates spanwise fin 308-2 in the stowed position when rotor assembly 110 is in operation (e.g., rotor assembly 110 is mechanically driven in rotation). In the stowed position, spanwise fin 308-2 pivots at surface 306 along an edge that is substantially parallel with longitudinal direction 406, which allows spanwise fin 308-2 to lay flat with respect to surface 306. Although spanwise fin 308-2 is illustrated near tip 410 of blade 304, spanwise fin 308-2 in other embodiments is located at other positions along blade 304 as a matter of design choice.

In some embodiments, spanwise fin 308-2 projects from surface 306 of blade 304 (see FIGS. 10-11) utilizing a spring (not shown) or other mechanical actuator (not shown) when rotor assembly 110 is not driven in rotation. For instance, spanwise fin 308-2 is held within a surface relief of surface 306 (not shown), and pivots out of the surface relief in response to a trigger. The trigger, in some embodiments, is the result of the release of a retaining device (not shown) or other mechanical feature which normally retains spanwise fin 308-2 proximate to surface 306 until activated.

In some embodiments, spanwise fin 308-2 conforms to and projects away from surface 306 of blade 304 in response to changes in a rotational rate of rotor assembly 110. For example, spanwise fin 308-2 passively transitions to the stowed position and conforms to surface 306 (see FIG. 12) in response to a rate of rotation being greater than a first rotational rate, and passively transitions to the deployed position and projects from surface 306 (see FIG. 11) in response to the rate of rotation being less than a second rotational rate. In some embodiments, the first rotational rate is greater than the second rotational rate.

In other embodiments, spanwise fin 308-2 passively transitions to the stowed position and conforms, and passively transitions to the deployed position and project away from surface 306 of blade 304 in response to changes in a chordwise airflow 1102 applied to spanwise fin 308-2. Chordwise airflow 1102 is a flow of air directed across blade 304 from a leading edge 1104 to a trailing edge 1106 of blade 304 that is generated as rotor assembly 110 rotates. For example, spanwise fin 308-2 passively transitions to the stowed position and conforms to surface 306 in response to chordwise airflow 1102 for blade 304 being greater than a first airflow (see FIG. 12), and passively transitions to the deployed position and projects away from surface 306 of blade 304 in response to chordwise airflow 1102 being less than a second airflow rate (see FIG. 11). In some embodiments, the first airflow rate is greater than the second airflow rate.

Figure 13:
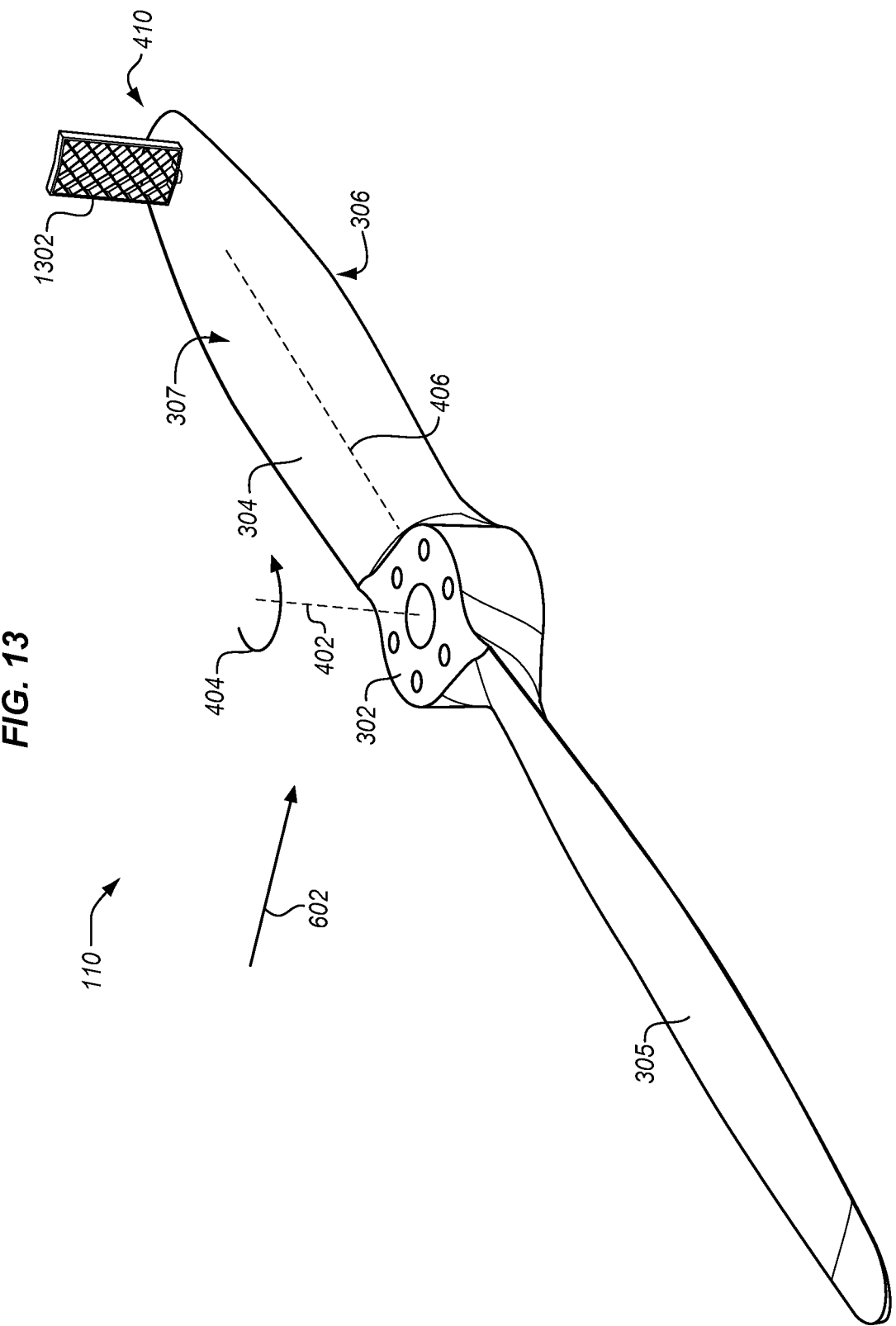
FIGS. 13-14 are perspective views of a rotor assembly that utilizes a grid fin as a blade alignment device in an illustrative embodiment.
Figure 14:
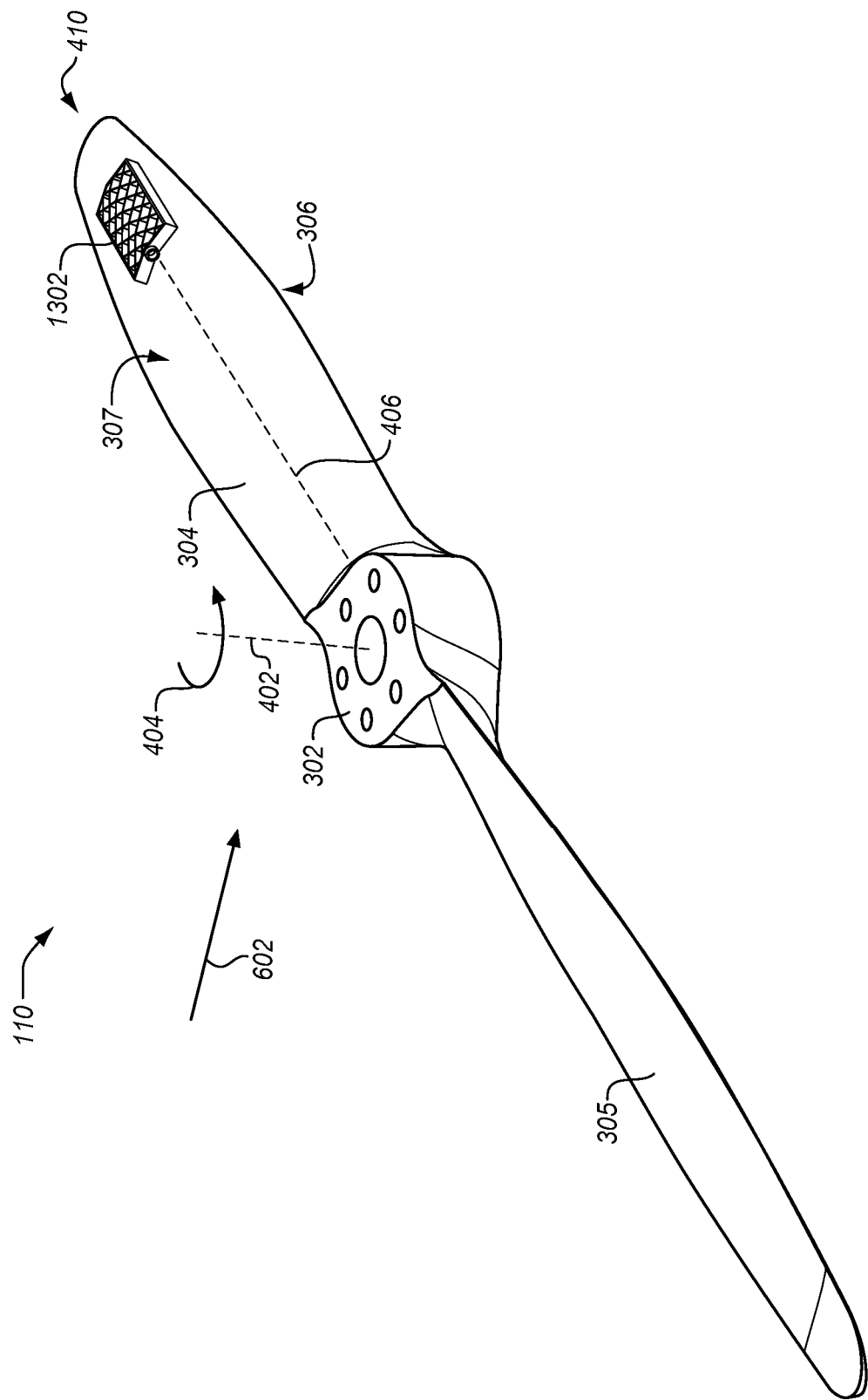

FIG. 13-14 is a perspective view of rotor assembly 110 that utilizes a grid fin 1302 as blade alignment device 308 in another illustrative embodiment. In this embodiment, a grid fin 1302 projects away from surface 307 of blade 304 when in the deployed position, where a chordwise orientation of grid fin 1302 is substantially parallel to longitudinal direction 406. Generally, grid fins are a lattice of smaller aerodynamic surfaces arranged within a box, where a chord of the aerodynamic surfaces is short with respect to the other dimensions. In the embodiment illustrated in FIG. 13, grid fin 1302 projects away from surface 307 of blade 304. In other embodiments, grid fin 1302 projects away from surface 306 of blade 304. In some embodiments, grid fin 1302 is positioned at any location between rotary hub 302 and tip 410 of blade 304.

Figure 15:
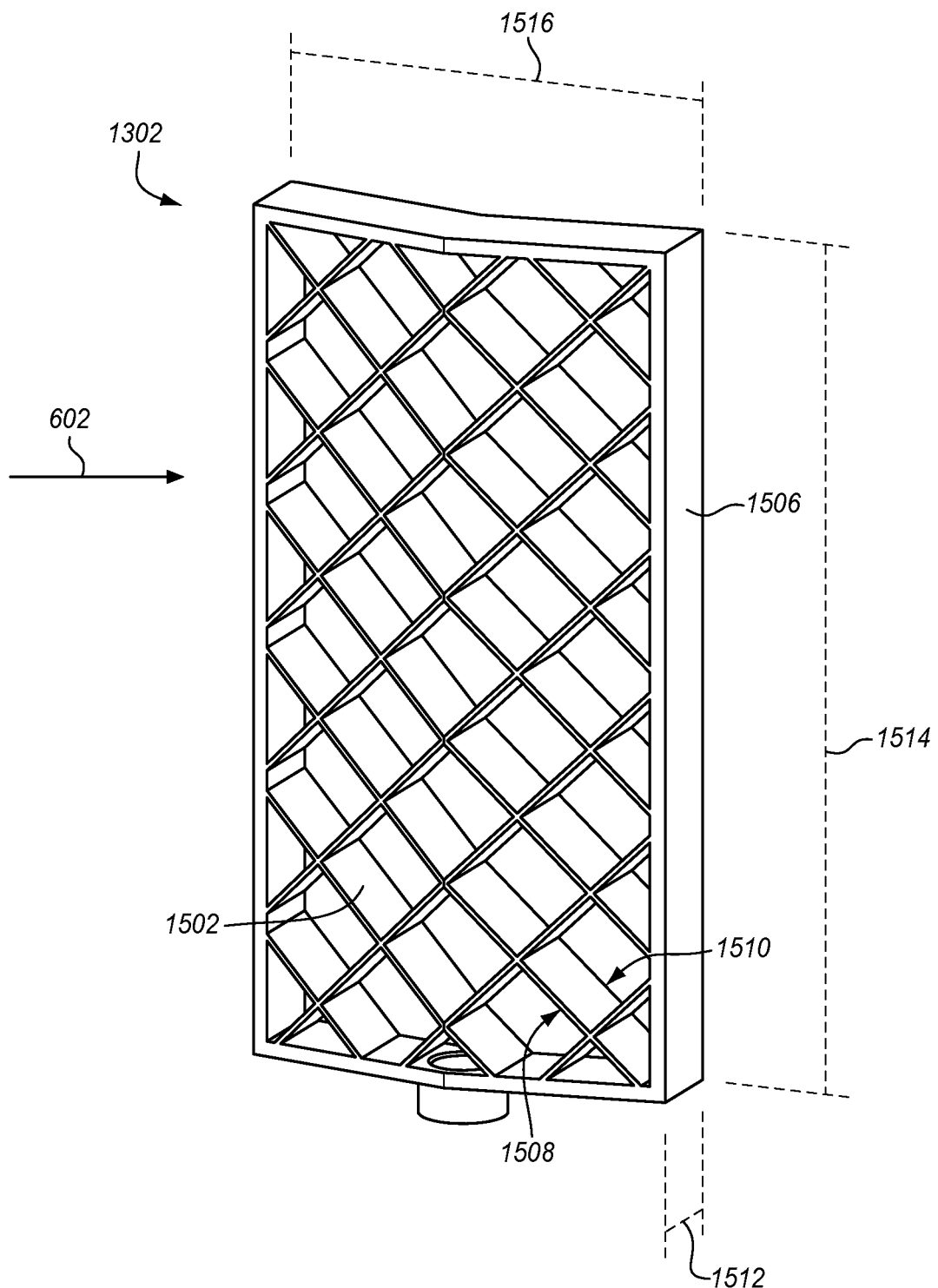
FIG. 15 is a perspective view of the grid fin of FIGS. 13-14 in an illustrative embodiment.

FIG. 14 is a perspective view of rotor assembly 110 in another illustrative embodiment. In this embodiment, grid fin 1302 conforms to surface 307 of blade 304 when in the stowed position. FIG. 15 is a perspective view of grid fin 1302 in an illustrative embodiment. In this embodiment, grid fin 1302 includes a plurality of fins 1502 configured in a lattice, which are included within a box 1506. Fins 1502 include a leading edge 1508 and a trailing edge 1510 that define a chord 1512 of grid fin 1302. As previously described, chord 1512 of grid fin 1302 is generally shorter than a height 1514 of grid fin 1302 or a width 1516 of grid fin 1302. As previously described with respect to blade alignment device 308, grid fin 1302 aligns blade 304 in a similar manner in the presence of airflow 602 generated when aircraft 100 is in forward flight.

Figure 16:
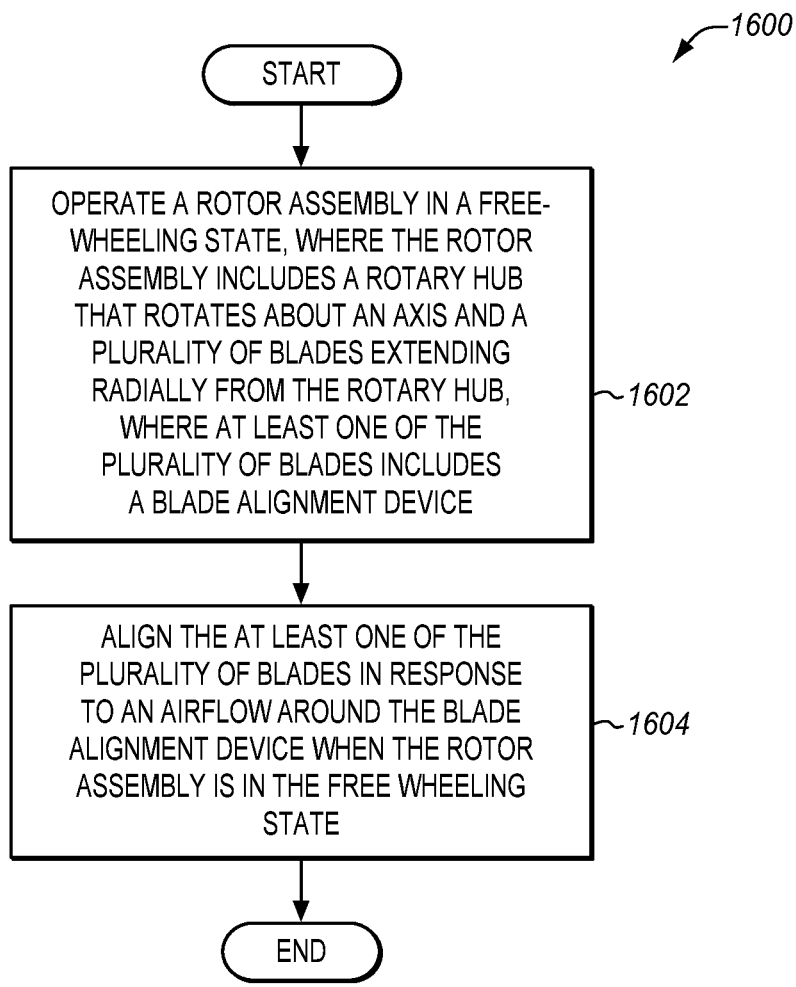
FIG. 16 is a flow chart of a method of re-positioning a rotor assembly when the rotor assembly is free-wheeling in an illustrative embodiment.

FIG. 16 is a flow chart of a method 1600 of operating a rotor assembly for aircraft, and FIGS. 17-20 are flow charts depicting additional details of method 1600 in various illustrative embodiments. The steps of method 1600 will be discussed with respect to rotor assembly 110, although method 1600 may apply to other rotor assemblies, not shows. The steps of method 1600 are not all inclusive, and may include other steps, not shown. Further, the steps may be performed in an alternate order.

Step 1602 of FIG. 16 comprises operating rotor assembly 110 in a free-wheeling state. This may occur, for example, when aircraft 100 is in forward flight and rotor assembly 110 is not driven in rotation. Step 1604 comprises aligning a blade that includes blade alignment device 308 (e.g., blade 304) in response to an airflow around blade alignment device 308. For example, longitudinal direction 406 of rotor assembly 110 is aligned in the direction of airflow 602 to maximize a reduction in drag. In one embodiment, blade 304 of rotor assembly 110 is oriented in a downstream position in airflow 602 and blade 305 of rotor assembly 110 are oriented in an upstream position in airflow 602.

Figure 17:
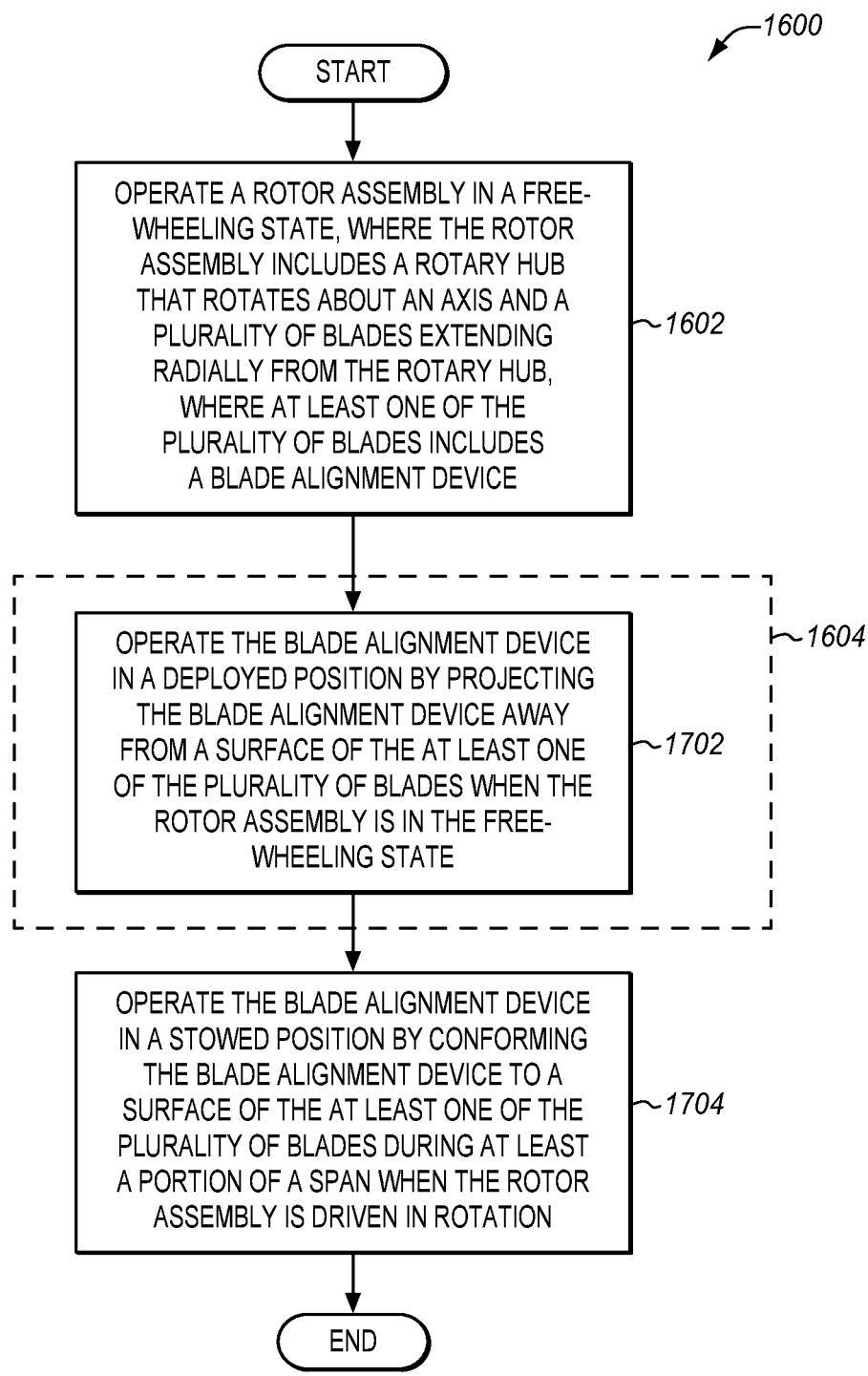
FIGS. 17-20 are flow charts depicting additional details of the method of FIG. 16 in illustrative embodiments.
Figure 18:
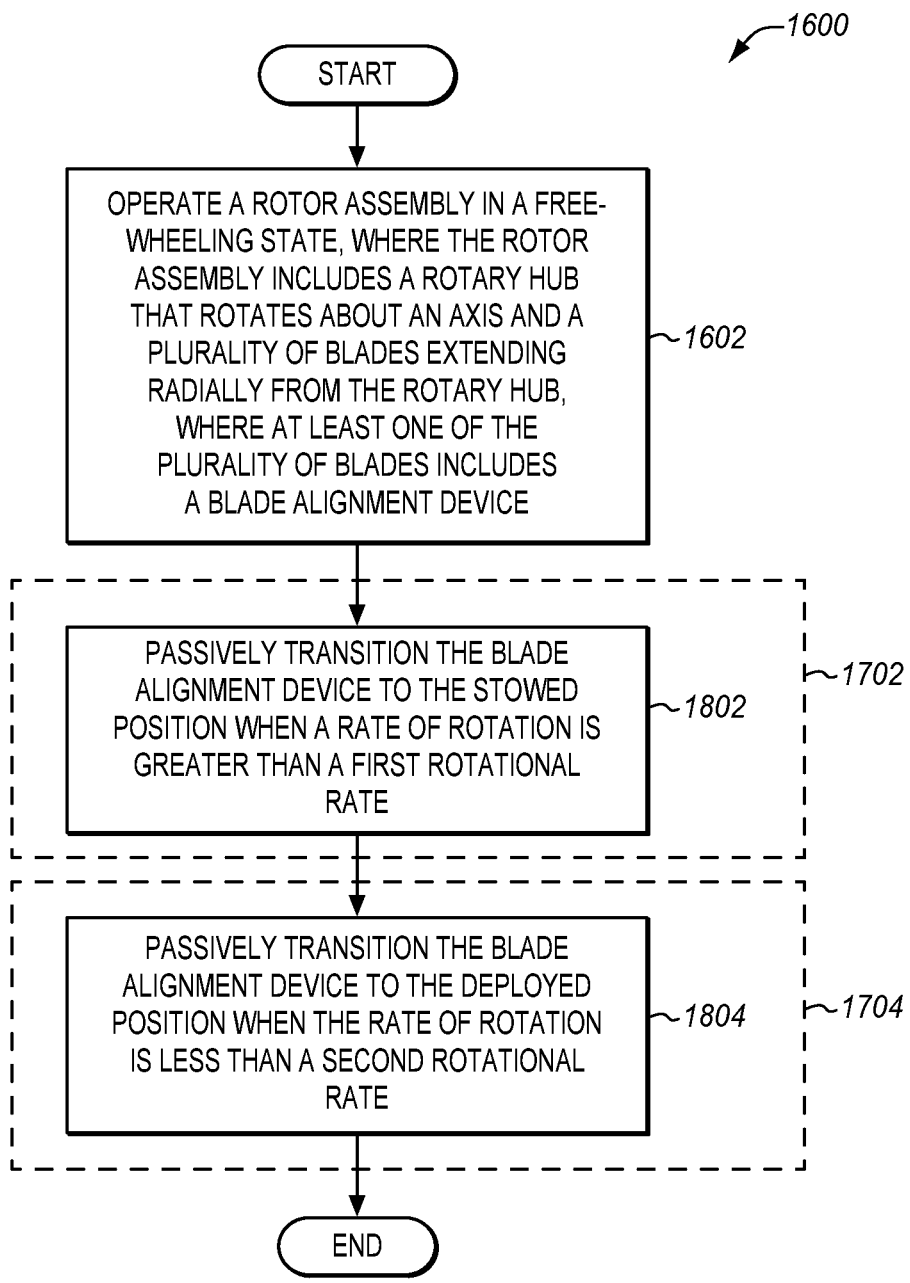

Step 1702 of FIG. 17 comprises operating blade alignment device 308 in the deployed position (e.g., blade alignment device 308 projects away from surface 306 of blade 304) when rotor assembly 110 is free-wheeling. Step 1704 comprises operating blade alignment device 308 in the stowed position (e.g., blade alignment device 308 conforms to surface 306 of blade 304 during a portion of a span) when rotor assembly 110 is driven in rotation. For example, during take-off, hover, and landing for aircraft 100, rotary hub 302 is driven in rotation by a mechanical power source to provide lift to aircraft 100. During this phase of operation, blade alignment device 308 operates in the stowed position and conforms to surface 306 of blade 304.

In some embodiments, blade alignment device 308 passively transitions between the stowed position and the deployed position based on conditions acting on rotor assembly 110. In one embodiment, blade alignment device 308 passively transitions to the stowed position when a rate of rotation of rotary hub 302 is greater than a first rotational rate (see FIG. 18, step 1802), and passively transitions to the deployed position when a rate of rotation of rotary hub 302 is less than a second rotational rate (see FIG. 18, step 1804).

Figure 19:
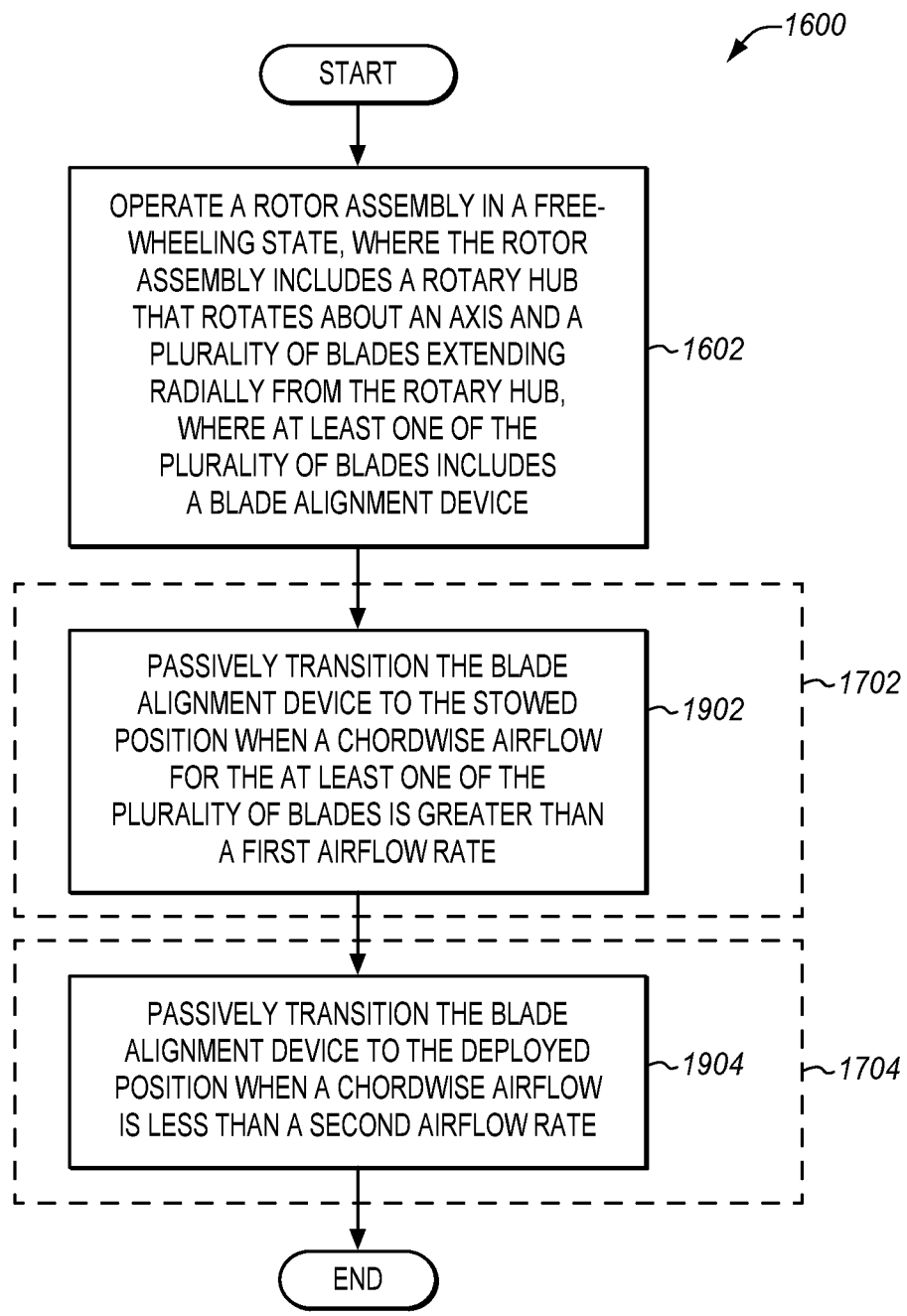

In another embodiment, blade alignment device 308 passively transitions to the stowed position in response to a chordwise airflow 1102 for blade 304 being greater than a first airflow rate (see FIG. 19, step 1902), and passively transitions to the deployed position in response to chordwise airflow 1102 for blade 304 being less than a second airflow rate (see FIG. 19, step 1904).

Figure 20:
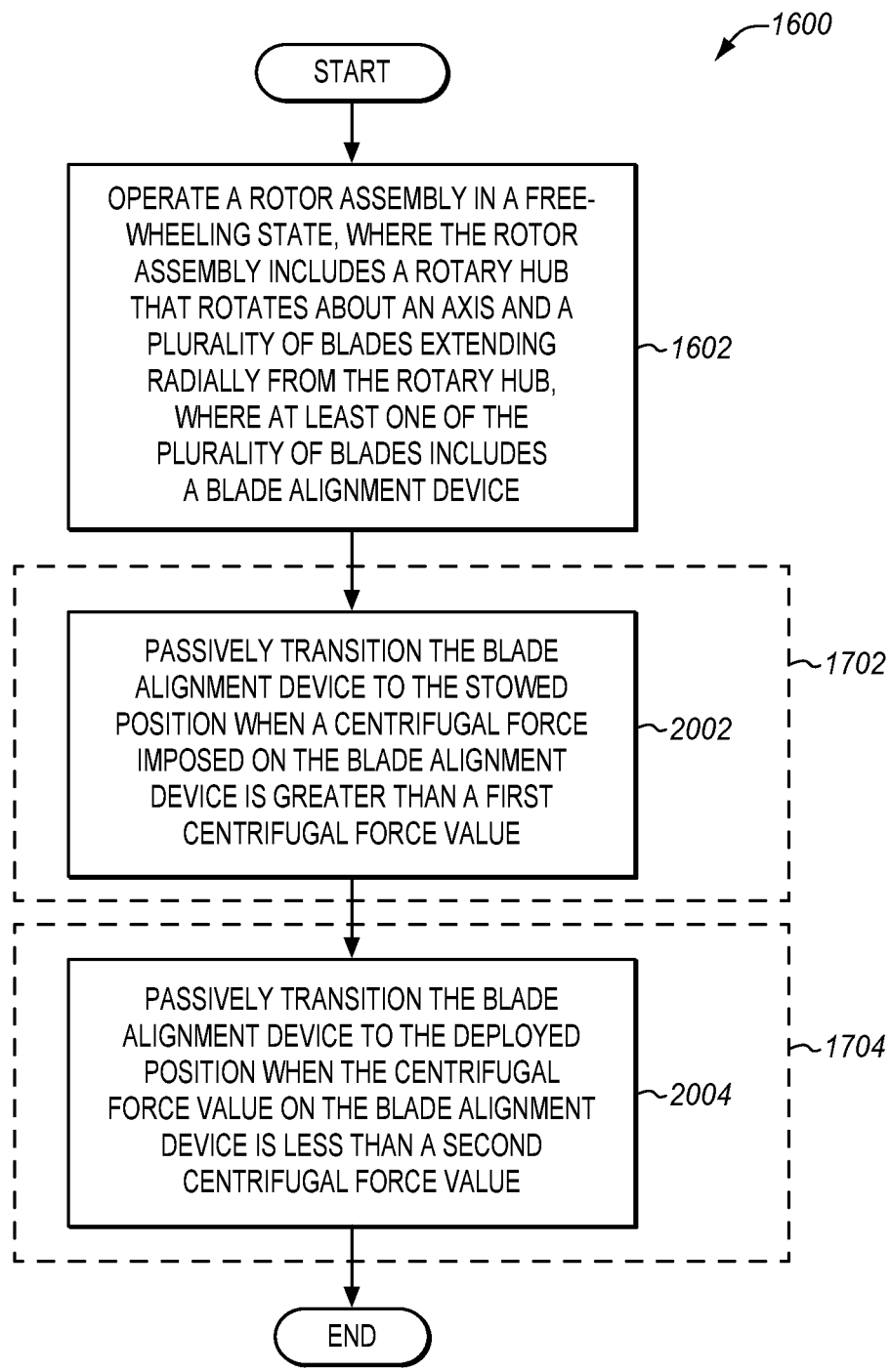

In yet another embodiment, blade alignment device 308 passively transitions to the stowed position in response to a centrifugal force imposed on blade alignment device 308 being greater than a first centrifugal force value (see FIG. 20, step 2002), and passively transitions to the deployed position in response to the centrifugal force imposed on blade alignment device 308 being less than a second centrifugal force value (see FIG. 20, step 2004).

The use of blade alignment device 308 for rotor assemblies 110 allows for the passive orientation of rotor assemblies 110 during the cruise phase of flight for aircraft 100, thereby reducing the drag imposed upon aircraft 100 for rotor assemblies 110 that are free-wheeling. Because blade alignment device 308 passively orients rotor assembly 110 during the cruise phase, mechanical power and/or complicated positioning sensors are not needed, which reduces the complexity of aircraft 100.

Although specific embodiments were described herein, the scope is not limited to those specific embodiments. Rather, the scope is defined by the following claims and any equivalents thereof.

What is claimed is:

1. A method of operating a rotor assembly for aircraft, the method comprising:
   operating the rotor assembly in a free-wheeling state when the aircraft is in forward flight, the rotor assembly comprising a rotary hub configured to rotate about an axis, and a plurality of blades extending radially from the rotary hub, wherein at least one of the plurality of blades includes a blade alignment device; and
   aligning the at least one of the plurality of blades that includes the blade alignment device with airflow generated when the aircraft is in forward flight in response to the airflow around the blade alignment device when the rotor assembly is in the free-wheeling state,
   wherein the blade alignment device comprises a spanwise fin pivotably coupled to an airfoil surface of the at least one of the plurality of blades along a longitudinal direction,
   wherein the spanwise fin pivots along an edge substantially parallel with the longitudinal direction to project away from the airfoil surface in a deployed position when the rotor assembly is in the free-wheeling state, and pivots along the edge to lay flat with respect to the airfoil surface in a stowed position when the rotor assembly is driven in rotation.

2. The method of claim 1, wherein:
   the spanwise fin is held within a surface relief of the airfoil surface when in the stowed position, and pivots out of the surface relief to the deployed position.

3. The method of claim 2, wherein:
   the spanwise fin is held within the surface relief of the airfoil surface by a retaining device.

4. The method of claim 1, wherein:
   the spanwise fin passively transitions to the stowed position when a rate of rotation of the rotor assembly is greater than a first rotational rate,
   the spanwise fin passively transitions to the deployed position when the rate of rotation of the rotor assembly is less than a second rotational rate, and
   the first rotational rate is greater than the second rotational rate.

5. The method of claim 1, wherein:
   the spanwise fin passively transitions to the stowed position when a chordwise airflow for the at least one of the plurality of blades is greater than a first airflow rate,
   the spanwise fin passively transitions to the deployed position when the chordwise airflow is less than a second airflow rate, and
   the first airflow rate is greater than the second airflow rate.

6. The method of claim 1, wherein:
   the spanwise fin is disposed near a tip of the at least one of the plurality of blades.

7. A rotor assembly for aircraft, the rotor assembly comprising:
   a rotary hub configured to rotate about an axis; and
   a plurality of blades extending radially from the rotary hub,
   wherein at least one of the plurality of blades includes a blade alignment device, wherein the rotor assembly is configured to operate in a free-wheeling state when the aircraft is in forward flight, wherein the blade alignment device is configured to align the at least one of the plurality of blades with airflow generated when the aircraft is in forward flight in response to airflow around the blade alignment device when the rotor assembly is in the free-wheeling state, wherein the blade alignment device comprises a spanwise fin pivotably coupled to an airfoil surface of the at least one of the plurality of blades along a longitudinal direction, wherein the spanwise fin pivots along an edge substantially parallel with the longitudinal direction to project away from the airfoil surface in a deployed position when the rotor assembly is in the free-wheeling state, and pivots along the edge to lay flat with respect to the airfoil surface in a stowed position when the rotor assembly is driven in rotation.

8. The rotor assembly of claim 7, wherein:
the spanwise fin is held within a surface relief of the airfoil surface when in the stowed position, and pivots out of the surface relief to the deployed position.

9. The rotor assembly of claim 8, wherein:
the spanwise fin is held within the surface relief of the airfoil surface by a retaining device.

10. The rotor assembly of claim 9, wherein:
the spanwise fin is configured to project from the airfoil surface utilizing a spring.

11. The rotor assembly of claim 7, wherein:
the spanwise fin is configured to passively transition to the stowed position when a rate of rotation of the rotor assembly is greater than a first rotational rate, and to passively transition to the deployed position when the rate of rotation is less than a second rotational rate; and
the first rotational rate is greater than the second rotational rate.

12. The rotor assembly of claim 7, wherein:
the spanwise fin is configured to passively transition to the stowed position when a chordwise airflow for the at least one of the plurality of blades is greater than a first airflow rate, and to passively transition to the deployed position when the chordwise airflow is less than a second airflow rate; and
the first airflow rate is greater than the second airflow rate.

13. The rotor assembly of claim 7, wherein:
the spanwise fin is disposed near a tip of the at least one of the plurality of blades.

14. The rotor assembly of claim 7, wherein:
the airfoil surface comprises a lower surface of the at least one of the plurality of blades.

15. An aircraft, comprising:
at least one rotor assembly configured to provide lift for the aircraft, the at least one rotor assembly comprising:
a rotary hub configured to rotate about an axis; and
a plurality of blades extending radially from the rotary hub, wherein the at least one rotor assembly is configured to operate in a free-wheeling state when the aircraft is in forward flight, wherein at least one of the plurality of blades includes a blade alignment device, the blade alignment device configured to align the at least one of the plurality of blades with airflow generated when the aircraft is in forward flight in response to airflow around the blade alignment device when the rotor assembly is in the free-wheeling state, wherein the blade alignment device comprises a spanwise fin pivotably coupled to an airfoil surface of the at least one of the plurality of blades along a longitudinal direction, wherein the spanwise fin pivots along an edge substantially parallel with the longitudinal direction to project away from the airfoil surface in a deployed position when the rotor assembly is in the free-wheeling state, and pivots along the edge to lay flat with respect to the airfoil surface in a stowed position when the rotor assembly is driven in rotation.

16. The aircraft of claim 15, wherein:
the spanwise fin is held within a surface relief of the airfoil surface when in the stowed position, and pivots out of the surface relief to the deployed position.

17. The aircraft of claim 16, wherein:
the spanwise fin is held within the surface relief of the airfoil surface by a retaining device.

18. The aircraft of claim 15, wherein:
the spanwise fin is configured to passively transition to the stowed position when a rate of rotation of the at least one rotor assembly is greater than a first rotational rate, and to passively transition to the deployed position when the rate of rotation is less than a second rotational rate, and
the first rotational rate is greater than the second rotational rate.

19. The aircraft of claim 15, wherein:
the spanwise fin is configured to passively transition to the stowed position when a chordwise airflow for the at least one of the plurality of blades is greater than a first airflow rate, and to passively transition to the deployed position when the chordwise airflow is less than a second airflow rate, and
the first airflow rate is greater than the second airflow rate.

20. The aircraft of claim 15, wherein:
the spanwise fin is disposed near a tip of the at least one of the plurality of blades.

21. The aircraft of claim 15, further comprising:
wings extending from opposite sides of a fuselage; and
a propeller that provides thrust for forward flight.

* * * * *